US005790329A

United States Patent [19]

Klaus et al.

[11] Patent Number: 5,790,329

[45] Date of Patent: Aug. 4, 1998

[54] COLOR CHANGING DEVICE FOR ILLUMINATION PURPOSES

[76] Inventors: Welm Klaus, Dobelklause 17, D-85567 Grafing; Feddersen-Clausen Oliver, Hakenstr. 10, D-44139 Dortmund, both of Germany

[21] Appl. No.: 534,739

[22] Filed: Sep. 27, 1995

[51] Int. Cl.$^6$ .................................. G02B 5/22; F21V 9/10

[52] U.S. Cl. .......................... 359/887; 359/889; 359/890; 362/168; 362/293

[58] Field of Search ..................................... 359/887, 889, 359/890, 891; 362/166, 167, 168, 293

[56] References Cited

U.S. PATENT DOCUMENTS

| | | | |
|---|---|---|---|
| 3,382,024 | 5/1968 | Councilman et al. | 359/889 |
| 3,880,520 | 4/1975 | Weisglass . | |
| 3,883,243 | 5/1975 | Weisglass et al. . | |
| 4,050,807 | 9/1977 | Barbieri | 359/890 |
| 4,359,280 | 11/1982 | Krause . | |
| 4,371,259 | 2/1983 | Howitt . | |
| 4,843,431 | 6/1989 | Horiguchi et al. | 359/889 |

*Primary Examiner*—Ricky D. Shafer
*Attorney, Agent, or Firm*—Gardner, Carton & Douglas

[57] ABSTRACT

A color changing device provides a continuously variable light color by means of the introduction of dichroic color filters into the light path of an illumination device. In the subtractive color mixing method for mixing of colors in an illumination apparatus according to the invention dichroic filters are provided parallel to each other and transverse to the beam path of the illumination apparatus, wherein the filters can be introduced into the beam path continuously and independently, so that a continuous mixing is achieved. At least four filters are used and wherein in view of the wavelength a broadband high-pass and a broadband low-pass, and two broadband band-stops are used, wherein the transmission regions of the two band-stops partly overlap so that with the filter combinations dominant colors with a high saturation can be generated.

12 Claims, 4 Drawing Sheets

COLOR CHANGING DEVICE FOR ILLUMINATION PURPOSES

The invention relates to a color changing device which provides a continuously variable light color by means of the introduction of dichroic color filters into the light path of an illumination device. Such color changing devices are used particularly in illumination spotlights with an image optic (tracking spotlight) etc.

BACKGROUND OF INVENTION

It is known that these color changing devices (e.g. DE 39 08 148 A1) and color changing devices of similar systems (e.g. EP 0 242 422 A1 and EP 0 415 164 A1) or those for color monitors are all based on the principle of three-color mixing. This basic principle is called RGB-color mixing because of the colors red, green and blue used and allows the generation of each color shade (hue) but not of each color purity (color saturation). For gaining a continuously variable light color as well as good color saturation, a color wheel, which is not continuously variable, with specially saturated colors is used additionally to the RGB system in complex illumination spotlights. In subtractive RGB-color mixing systems, the colors cyan, yellow and magenta are used, so that a combination of each two of the filters realizes the colors red, green and blue.

RGB color changing devices can only be used in such regions of illumination devices which are not imaged on the illuminated object, since the dichroic color filters are in most cases only partly arranged in the light path during the color mixing. The installation portion is normally arranged inside the spotlight in between the objective lenses, where the illumination field of the spotlight lamp is imaged. For this reason, a subsequent installation in existing illumination devices is very expensive.

Further RGB color changing devices normally need their own control panel or three channels on a conventional light control desk, such as those used in theaters, for controlling the single color filters, which is very inconvenient in routine use.

It is therefore an object of the invention to provide a continuous color mixing method and a color changing device which generates an improved hue as well as color transitions between very saturated colors.

SUMMARY OF THE INVENTION

In the subtractive color mixing method for mixing of colors in an illumination apparatus according to the present invention, dichroic filters are provided parallel to each other and transverse to the beam path of the illumination apparatus, wherein the filters can be introduced into the beam path continuously and independently, so that a continuous mixing is achieved, wherein at least four filters are used, and wherein, with respect to the wavelength, a broadband high-pass and a broadband low-pass, and two broadband band-stops are used, the transmission regions of the two band-stops partly overlapping so that, with the filter combinations, dominant colors with a high saturation can be generated. Preferably the transmission regions of the high-pass and low-pass partly overlap.

A preferred embodiment of the subtractive color mixing method uses five filters, wherein the additional filter is a band-pass with respect to the transmission. Further it is possible to use six dichroic filters in said color mixing method, wherein the additional filter is preferably a band-pass with respect to the transmission. It is known that a band-pass can be built from a high-pass and a low-pass with an appropriate common transmission region. The splitting of a band-pass filter (or band-stop filter) into a high-pass and a low-pass filter leads to a system with one more filter but the same performance. For example, the same performance as a six filter system would be achieved by a seven filter system. Therefore, in this context, a band-pass or a band-stop can be replaced with a high-pass and a low-pass filter. Further, it is possible to use in the six filter system instead of a band-pass as the sixth filter a very broad high-pass to suppress an unwanted red transmission, which is usually present in dichroic filters for green and blue.

If five or six filters are used in the subtractive color mixing method according to the invention, the transmission regions of the high-pass and the low-pass do not necessarily overlap.

If four dichroic filters are used in the subtractive color mixing method according to the invention, the filters have the following approximate preferable transmission regions:

blueviolet≈380 nm to 490 nm and 650 nm to 780 nm (1), redviolet≈380 nm to 450 nm and 570 nm to 780 nm (2), cyan≈380 nm to 560 nm (3)

and yellow≈500 nm to 780 nm (4).

If six dichroic filters are used, they have the following approximate transmission regions:

magenta≈380 nm to 450 nm and 650 nm to 780 nm (5)

pink≈380 nm to 490 nm and 580 nm to 780 nm (6)

green≈500 nm to 540 nm (7)

light green≈480 nm to 590 nm (8)

cyan≈380 nm to 520 nm (9)

and yellow≈520 nm to 780 nm (10)

Preferably, in the subtractive color mixing method according to the invention, the filters are arranged so that their sides are close to one another, so that the mixing system only occupies minimal space. In other words, the filters can be spaced from one another by a small gap so that their sides are parallel to one another or the filter sides can be in contact with one another.

In a preferred embodiment of the invention, said subtractive color mixing method is used in a color changing device. Said color changing device comprises a color mixing system for the operation of the color mixing method and a control element for controlling the movement of the filters.

In a preferred embodiment, said color changing device is in the form of a plug-in cassette arranged in a stage spotlight with imaging optics in between the objective lenses in the region of the illumination field image of a lamp, the control element being situated outside of the spotlight body.

Further, the control element of the color changing device comprises a microprocessor which converts two analogue or digital multiplex ("DMX") signals into control signals, the analogue or DMX signals defining the color saturation and hue.

The invention includes the use of more than three dichroic color filters. The transmission region of the filters is chosen, so that, on one hand, color transitions between color shade (hue) and color saturation can be continuously generated, as in an RGB system, without the need to cover the released region in the light path during the removing of a color filter with a new filter, and so that, on the other hand, according to the colormetric laws, very high color saturations are possible together with relatively large light transmission. The basic structure of a four filter mixing system exhibits a significantly improved saturation in the blue-magenta-red region. Thus, the positive features of a three filter mixing system are retained. The basic structure of said six filter mixing system covers nearly the whole generatable color space. In comparison with the three filter mixing system, small brightness losses occur at the color transitions cyanogene-green and green-yellow, which, however, can be neglected because of the other advantages.

If the color changing device is constructed in the form of a plug-in cassette, the dichroic filters can be inserted through an opening in the spotlight body with the filter control mounted on the body outside of the spotlight. Many illumination spotlights are arranged in such a way that the suitable position for mounting of the color changing device on the spotlight body consists of a simple sheet resting on continuous casting profiles, which can be easily replaced. Other spotlights, which do not use completely dimerable daylight lamps, comprise in the region of the illumination field image between the objective lenses an opening for darkening shutters. This opening has to be enlarged a little to insert the color changing device. The filters can be pulled back into the filter control or pulled into the light path or can be tilted sideways out of the light path. With the above embodiment, the color changing device needs only little space in the spotlight body and can be subsequently mounted in many spotlights with zoom objectives. With the use of a microprocessor in the control element of the color changing device, this device becomes independent of special controlling systems and can be controlled by conventional analog- or DMX-light control desks with two channels, which control the color shade (hue) and the color saturation.

BRIEF DESCRIPTION OF THE DRAWINGS

Preferred embodiments of the invention will be described in detail with reference to the drawings, in which.

DESCRIPTION OF THE PREFERRED EMBODIMENTS

Figure 1:
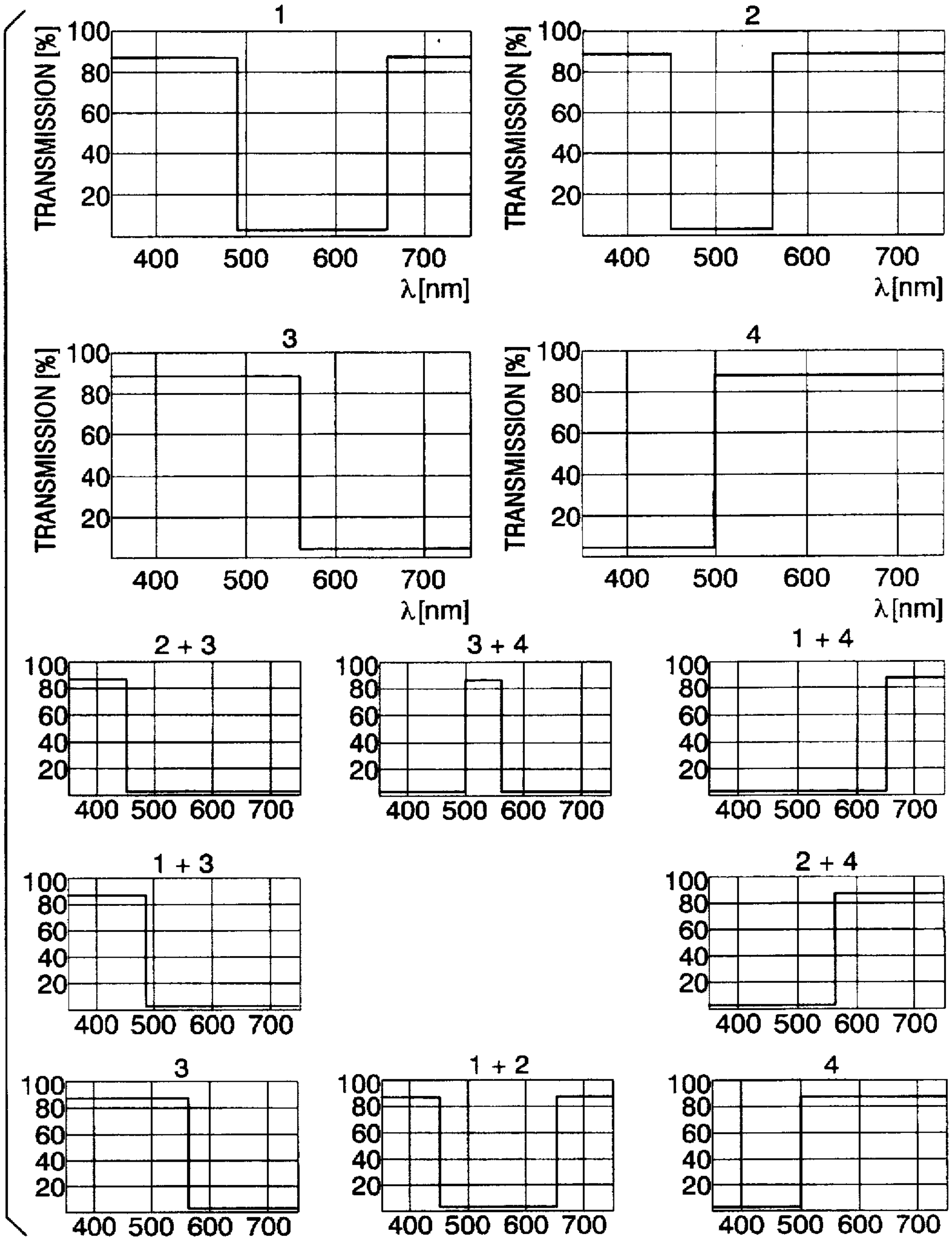
FIG. 1 is a basic illustration of the transmission regions of the dichroic filters of a four filter mixing system.

FIG. 1 shows the basic transmission regions of the dichroic filters 1, 2, 3 and 4, wherein filters 1 and 2 are broad band-stops, filter 3 is a broad low-pass and filter 4 is a broad high-pass. Further, diagrams of the superposition of two filters and of the single filters are shown, which form the unmixed colors with largest color saturations of the four filter mixing system and at the same time allow a continuous and endless color transition through all color shades through the transmissions explained in the following paragraph:

The filter combination redviolet and cyan 2+3 gives a dark blue. Adding the filter blueviolet 1 gives no color change, as can be seen from the diagrams. But this intermediate step is necessary to obtain, upon removal of redviolet 2, a transition to blue 1+3. Removing blueviolet 1 gives a transition to cyan 3. Adding yellow 4 results in green 3+4 and further removing cyan 3 gives yellow 4. Adding redviolet 2 gives a transition to redviolet 2+4 and adding blueviolet 1 gives dark redviolet 1+4+(2). Removing yellow 4 results in magenta 1+2, and if cyan 3 is added, results again in the generation of dark blue (1)+2+3. Now it is just necessary to remove blueviolet 1 (no color changing) in order to return to the starting point.

For the further discussion, the following shortcuts or symbols are used for the sake of simplicity: adding is represented by "+", removing is represented by "–", filters are illustrated by their reference numbers, expressions printed in bold reference illustrated diagrams and expressions in parentheses indicate filter movements which do not cause color changes. A color transition comparable to the three filter mixing system with a lower color saturation but a higher light yield, is obtained in the following way: 1+3, –1, 3, +4, 3+4, –3, 4, +2, 2+4, –4, 2, +1, 1+2, –2, 1, +3, 1+3. Transition between these two color saturations and white are obtainable when the filters are not completely introduced in the light path of an illumination device. A band-stop, as it is used in the first embodiment, can be easily built by a high-pass and a low-pass filter, which would lead to a five filter mixing method with the same features as the above described four filter mixing method. In part, a band-stop can be replaced with a high-pass and a low-pass which do not have a common transmission region and each band-pass can be realized with a high-pass and a low-pass which have a common region of transmission. If one of the two band-stops is replaced by a high-pass and a low-pass, then preferably the remaining band-stop would have a transmission in the blueviolet and dark red (380–430 nm and 650–780 nm). The high-pass would have a transmission of intermediate blue (380–480 nm) and the low-pass would have a transmission of orange (590–780 nm), so that both filters would replace the second band-stop.

Figure 2:
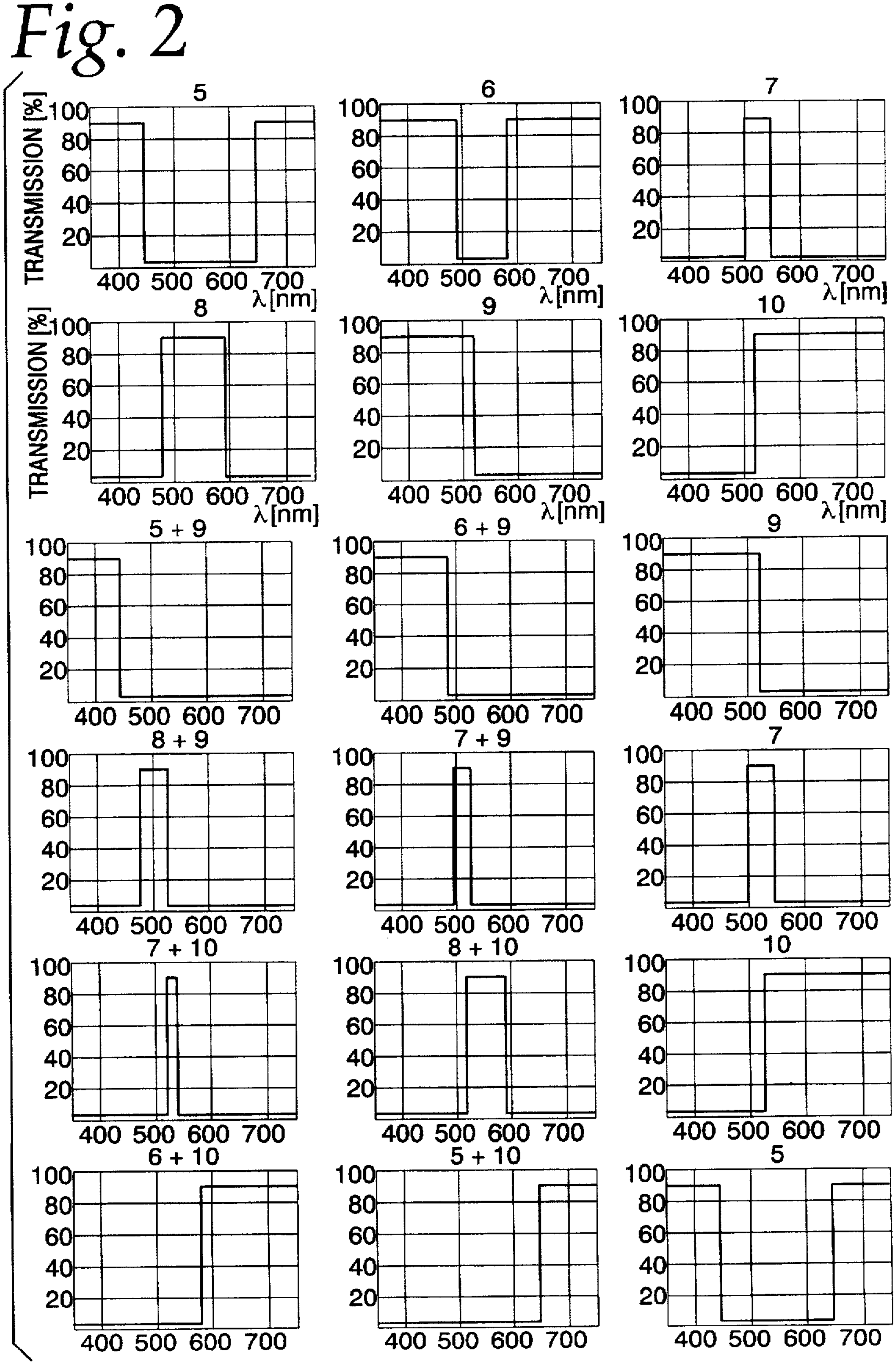
FIG. 2 is a basic illustration of the transmission regions of the dichroic filters of a six filter mixing system.

FIG. 2 shows, like FIG. 1, the color shade transitions of a six filter mixing system. A transition with very saturated colors is obtained by: 5+9, (+6), –5, 6+9, –6, 9, +8, 8+9, +7, (–8), 7+9, –9, 7, +10, 7+10, (+8), –7, 8+10, –8, 10, +6, 6+10, (+5), –6, 5+10, –10, 5, +9, 5+9.

A less saturated color transition is obtained by: 6+9, –6, 9, +8, 8+9, –9, 8+10, 8+10, –8, 10, +6, 6+10, –10, 6, –9, 6+9.

It is again pointed out that the diagrams are fundamental transmission regions because the slopes of the dichroic filters are very steep, but the dichroitic filters cannot be manufactured with rectangular transmission curves.

Figure 3:
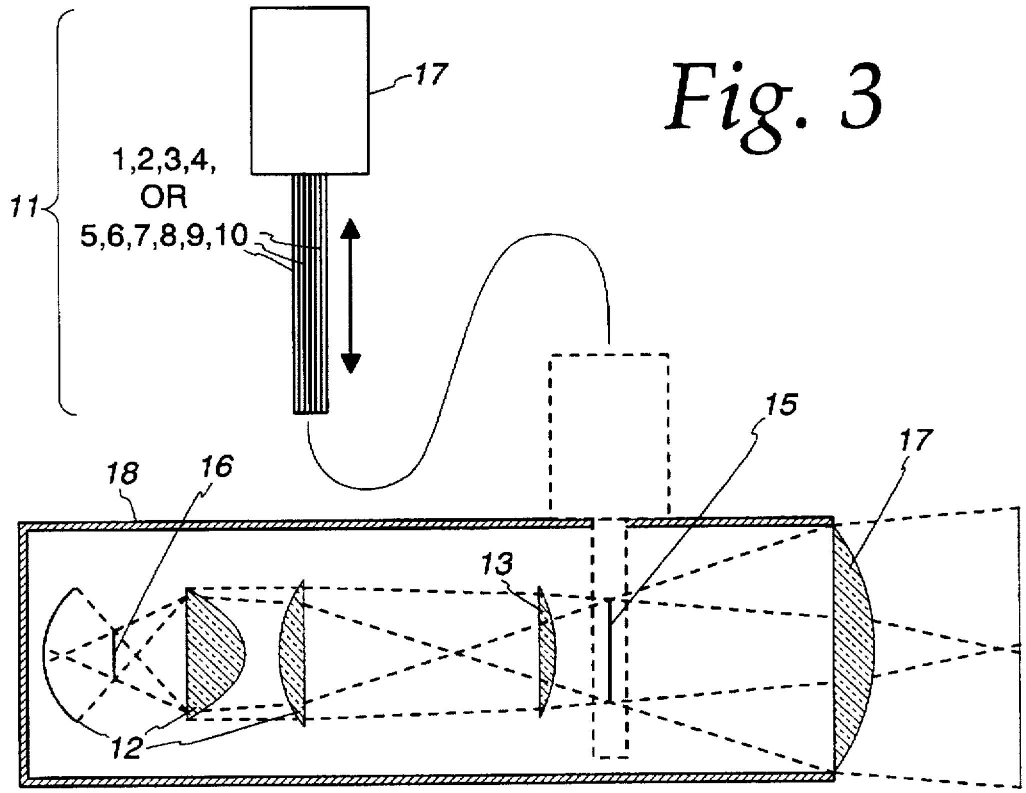
FIG. 3 is a schematic side view of a stage spotlight with a color changing device constructed as a plug-in cassette.

FIG. 3 shows a stage spotlight with a condensor optic 12 and two objective lenses 13, 14 and a color changing device in the form of a plug-in cassette 11 with a control element 17 and dichroic color filters 1, 2, 3, 4; 5, 6, 7, 8, 9, 10; or 20, 21, 22, 23, 24. With the help of a curved arrow and dotted outline, it is shown how the color changing device is assembled. A double arrow shows the direction of movement of the dichroic color filters 1, 2, 3, 4, 5, 6, 7, 8, 9, 10; or 20, 21, 22, 23, 24. The plug-in cassette 11 is introduced in such a way, that it is arranged in the region of the illumination field image 15 of a lamp 16 and that the control element 17 is situated outside the spotlight and mounted on the body 18 of the spotlight. To lower the thermal stress of the control element 17, it is preferable to introduce the plug-in cassette 11 from the rear side of the illumination spotlight. The control element of the color changing device is not part of the invention; for this reason, its description has been omitted. Further explanations concerning the control of the filters are redundant, because a skilled person is able to build a control element 17 with an integrated microprocessor and the help of the above description and basic colormetrical knowledge. The light path of the light in the stage spotlight is schematically shown by fine dotted lines.

Figure 4:
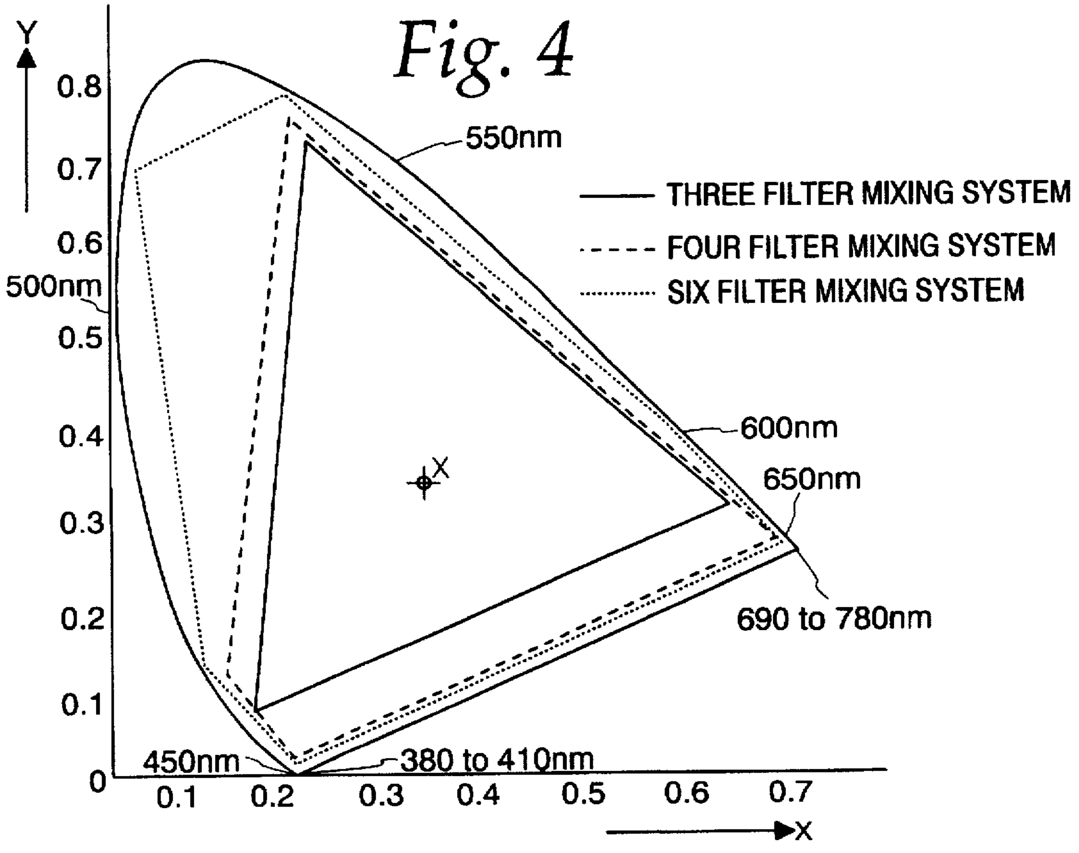
FIG. 4 is a basic comparison of the color possibilities of three, four and six filter mixing system according to the standard color table of German Industrial Standard ("DIN") 5033.

In FIG. 4, the color regions, which can be generated by the different mixing systems, are described through the standard color table according to DIN 5033. The curved line with the connecting straight line is the spectral color line and comprises the space of all colors. The spectral color line is formed through the saturated colors. "X" is the non-colored point (white). In this color table, the color possibilities of the six filter system (fine dotted), of the four filter system (big dotted), and of the conventional three filter system with covering lines are depicted.

Figure 5:
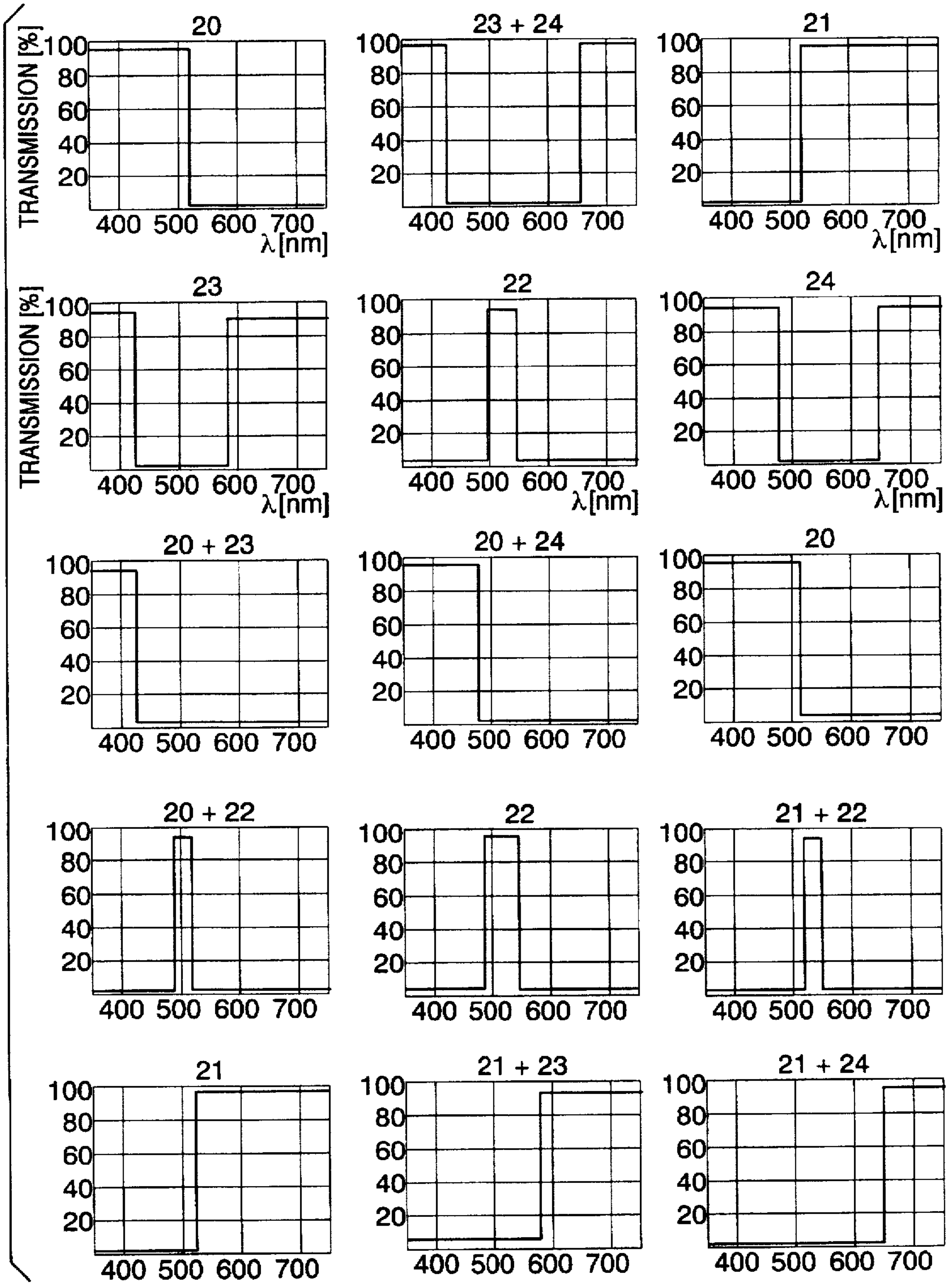
FIG. 5 shows the embodiment of a five filter mixing method.

FIG. 5 shows the possibility of a five filter mixing method. The method uses a low-pass filter 20, a high-pass filter 21, a comparatively small band-pass 22, and two broad band-stops 23 and 24, wherein the wavelengths of the filters are given in the drawing. In this example the high-pass 21 and low-pass 20 do not overlap. Transitions with saturated colors can be obtained in the following way using the above defined abbreviations:

20+23, (+24), −23, 20+24, −24, 20, +22, 20+22, −20, 22, +21, 21+22, −22, 21, +23, 21+23, (+24), −23, 21+24, (+23), −21, 23+24, +20, (−24), 20+23.

In general, expressions in parenthesis describe filter movements which do not cause a color change but are necessary for the operation of the color mixing method. These unpractical filter movements can be partly avoided if the respective filter is introduced into the light path in the previous filter movement step. For example, the filter combination 2+3 gives the same dark blue as the filter combination 1+2+3. If the combination 1+2+3 is always used for the generation of dark blue, the transitions to magenta 1+2 or blue 1+3 can be done without any intermediate step.

While the invention has been described in connection with certain embodiments, it should be understood that it is not intended to limit the invention to those particular embodiments. To the contrary, it is intended to cover all alternatives, modifications and equivalents falling within the spirit and scope of the invention as defined by the appended claims.

We claim:

1. A subtractive color mixing device for mixing of colors in an illumination apparatus comprising at least four dichroic filters provided parallel to each other and transverse to the beam path of the illumination apparatus and capable of being introduced into the beam path continuously and independently so that a continuous mixing results, the filters including a broad high-pass, a broad low-pass and two broad band-stops, wherein the transmission regions of the two band-stops partly overlap so that dominant colors with a high saturation can be generated from filter combinations.

2. The subtractive color mixing device according to claim 1, wherein the transmission regions of the high-pass and low-pass partly overlap.

3. The subtractive color mixing device according to claim 1, wherein at least five filters are provided, the additional filter being a band-pass with respect to the transmission.

4. The subtractive color mixing device according to claim 3, wherein at least six filters are provided, the additional filter being a band-pass with respect to the transmission.

5. The subtractive color mixing device according to claim 4, wherein the six dichroic filters have the following approximate transmission regions:

magenta≈380 nm to 450 nm and 650 nm to 780 nm, pink≈380 nm to 490 nm and 580 nm to 780 nm, green≈500 nm to 540 nm, light green≈480 nm to 590 nm, cyan≈380 nm to 520 nm and yellow≈520 nm to 780 nm.

6. The subtractive color mixing device according to claim 3, wherein the transmission regions of the high-pass and the low-pass do not overlap.

7. The subtractive color mixing device according to claim 1, wherein the four dichroic filters have the following approximate transmission regions:

blueviolet≈380 nm to 490 nm and 650 nm to 780 nm, redviolet≈380 nm to 450 nm and 570 nm to 780 nm, cyan≈380 nm to 560 nm and yellow≈500 nm to 780 nm.

8. The subtractive color mixing device according to claim 1, wherein the filters are arranged with a small gap between each other.

9. The subtractive color mixing device according to claim 1, wherein the device includes a control element for controlling the movement of the filters.

10. The subtractive color mixing device according to claim 9, wherein the device is in the form of a plug-in cassette adapted to be arranged in an illumination apparatus comprising a stage spotlight having imaging optics, between objective lenses in the region of the illumination field image of the lamp of the spotlight, the control element being situated outside the body of the spotlight.

11. The subtractive color mixing device according to claim 10, wherein the control element comprises a microprocessor which converts two analogue or digital multiplex signals into control signals, the analogue or digital multiplex signals defining the color saturation and hue.

12. A subtractive color mixing device for mixing of colors in an illumination apparatus comprising:

at least four dichroic filters provided parallel to each other and transverse to the beam path of the illumination apparatus and capable of being introduced into the beam path continuously and independently so that a continuous mixing results, the filters including a broad high-pass, a broad low-pass and two broad band-stops, wherein at least one of the band-stops includes a high-pass and a low-pass, and wherein the transmission regions of the two band-stops partly overlap so that dominant colors with high saturation can be generated from filter combinations.

* * * * *